US008757709B2

(12) United States Patent
Rawlinson et al.

(10) Patent No.: US 8,757,709 B2
(45) Date of Patent: Jun. 24, 2014

(54) REINFORCED B-PILLAR ASSEMBLY WITH REINFORCED ROCKER JOINT

(75) Inventors: Peter Dore Rawlinson, Playa Del Rey, CA (US); Michael John Baldwin, Sunnyvale, CA (US); Hitendra Laxmidas Gadhiya, Irvine, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 245 days.

(21) Appl. No.: 13/308,408

(22) Filed: Nov. 30, 2011

(65) Prior Publication Data

US 2012/0153675 A1    Jun. 21, 2012

Related U.S. Application Data

(63) Continuation-in-part of application No. 13/308,206, filed on Nov. 30, 2011.

(60) Provisional application No. 61/424,900, filed on Dec. 20, 2010.

(51) Int. Cl.
*B62D 25/04* (2006.01)

(52) U.S. Cl.
CPC ..................................... *B62D 25/04* (2013.01)
USPC ................................ 296/203.03; 296/193.06

(58) Field of Classification Search
USPC ............. 296/187.12, 193.05, 193.06, 203.03, 296/209
See application file for complete search history.

(56) References Cited

U.S. PATENT DOCUMENTS

| | | | |
|---|---|---|---|
| 2,007,255 A * | 7/1935 | Rohr ........................ | 296/193.06 |
| 4,471,992 A | 9/1984 | Matsuura et al. | |
| 4,826,238 A * | 5/1989 | Misono et al. ................ | 296/209 |
| 4,911,495 A | 3/1990 | Haga et al. | |
| 5,586,799 A * | 12/1996 | Kanemitsu et al. ....... | 296/203.02 |
| 5,619,784 A * | 4/1997 | Nishimoto et al. ............ | 29/430 |
| 6,129,410 A | 10/2000 | Kosaraju et al. | |
| 6,234,568 B1 * | 5/2001 | Aoki ........................ | 296/203.04 |
| 6,328,376 B2 * | 12/2001 | Son ......................... | 296/203.03 |
| 6,519,854 B2 | 2/2003 | Blank | |
| 6,857,692 B2 | 2/2005 | Cardimen et al. | |
| 7,001,097 B2 * | 2/2006 | Wang et al. ................... | 403/231 |
| 7,052,072 B2 * | 5/2006 | Patberg ....................... | 296/146.9 |
| 7,083,844 B2 | 8/2006 | Yamamoto | |
| 7,237,832 B2 * | 7/2007 | Saeki ........................ | 296/193.06 |
| 7,293,823 B2 * | 11/2007 | Chen et al. ................ | 296/203.03 |
| 7,407,222 B2 * | 8/2008 | Anderson et al. ........ | 296/193.06 |
| 7,464,986 B2 | 12/2008 | Maki et al. | |
| 7,735,906 B2 * | 6/2010 | Takahashi et al. ........ | 296/193.06 |
| 7,815,247 B2 * | 10/2010 | Obayashi ................. | 296/193.06 |
| 7,857,377 B2 | 12/2010 | Chen et al. | |
| 8,007,032 B1 | 8/2011 | Craig | |
| 8,029,047 B2 * | 10/2011 | Kim et al. ................. | 296/193.06 |
| 8,235,458 B2 * | 8/2012 | Mori ......................... | 296/193.06 |
| 8,262,152 B2 * | 9/2012 | Okumura et al. ......... | 296/193.06 |
| 8,414,068 B1 * | 4/2013 | Na et al. ................... | 296/193.06 |
| 8,439,428 B2 * | 5/2013 | Imamura .................. | 296/193.05 |
| 8,439,429 B2 * | 5/2013 | Shida et al. .............. | 296/193.06 |
| 8,480,163 B2 * | 7/2013 | Mori ......................... | 296/193.06 |
| 8,491,047 B1 * | 7/2013 | Moll ......................... | 296/193.06 |

(Continued)

*Primary Examiner* — Glenn Dayoan
*Assistant Examiner* — Paul Chenevert
(74) *Attorney, Agent, or Firm* — J. Richard Soderberg (57) ABSTRACT

A reinforced B-pillar assembly that achieves improved side impact resistance is provided in which the B-pillar assembly is mechanically coupled to an outer mounting surface of the rocker panel as well as to an extended brace that is attached to the upper and rear mounting surfaces of the rocker.

16 Claims, 12 Drawing Sheets

(56) References Cited

U.S. PATENT DOCUMENTS

| | | | |
|---|---|---|---|
| 8,496,288 B2 * | 7/2013 | Juettner et al. | 296/193.05 |
| 2009/0261622 A1 | 10/2009 | Rill et al. | |
| 2010/0194147 A1 * | 8/2010 | Aul et al. | 296/193.06 |
| 2010/0301630 A1 | 12/2010 | Ohta et al. | |
| 2010/0308623 A1 | 12/2010 | Bodin et al. | |
| 2010/0314905 A1 | 12/2010 | Mori | |
| 2011/0101734 A1 * | 5/2011 | Gunther et al. | 296/193.06 |
| 2011/0241384 A1 * | 10/2011 | Mori | 296/193.06 |
| 2012/0098297 A1 * | 4/2012 | Kurokawa | 296/193.06 |
| 2012/0153676 A1 * | 6/2012 | Shono | 296/193.06 |
| 2012/0153682 A1 | 6/2012 | Rawlinson et al. | |
| 2012/0161472 A1 | 6/2012 | Rawlinson et al. | |
| 2012/0256445 A1 * | 10/2012 | Baccouche et al. | 296/193.06 |
| 2012/0261950 A1 * | 10/2012 | Balzer et al. | 296/193.05 |
| 2012/0274099 A1 * | 11/2012 | Tamura | 296/193.06 |
| 2012/0313400 A1 * | 12/2012 | Balzer et al. | 296/193.06 |
| 2013/0020833 A1 * | 1/2013 | Yao | 296/193.06 |

\* cited by examiner

REINFORCED B-PILLAR ASSEMBLY WITH REINFORCED ROCKER JOINT

CROSS-REFERENCE TO RELATED APPLICATION

The present application is a continuation-in-part of U.S. patent application Ser. No. 13/308,206, filed 30 Nov. 2011, and claims benefit of the filing date of U.S. Provisional Patent Application Ser. No. 61/424,900, filed 20 Dec. 2010.

FIELD OF THE INVENTION

The present invention relates generally to vehicle structures and, more particularly, to an assembly comprising a rocker panel and a B-pillar.

BACKGROUND OF THE INVENTION

Modern vehicles use a variety of structures to protect the vehicle's occupants during a crash. Some of these structures are used to control the transmission of the crash energy to the passenger compartment while other structures, such as seat belts, head restraints, and air bags, are intended to restrain passenger movement during a crash, thereby preventing the passengers from hurting themselves as their bodies react to the crash forces. Side impact collisions present a particularly challenging problem to vehicle safety engineers, both due to the relatively low position of the rocker panels on many small vehicles as well as the difficulty of implementing an impact resistant side structure while taking into account vehicle doors and doorways.

U.S. Pat. No. 8,007,032, issued 30 Aug. 2011, discloses an automotive energy absorbing side structure that includes a wide-based B-pillar with an internal reinforcing tube, a rocker with an internal bulkhead, a rear rocker, and at least one cross-member extending inward from the rocker. The disclosed cross-members are designed to transfer impact loads to the floor, the cross-members and the tunnel brace.

An alternate approach to reducing intrusion into the passenger compartment during a side impact collision is disclosed in U.S. Pat. No. 6,129,410, issued 10 Oct. 2000. In the disclosed system, a reinforcement member is fixed to the B-pillar and coupled to the hinge plates of the vehicle's doors. During a side impact collision, impact energy is transferred through the vehicle's door hinges.

U.S. Pat. No. 7,857,377, issued 28 Dec. 2010, discloses an alternate system in which the B-pillars are hydro-formed to yield a stronger pillar. After forming, the tubular pillar is pinched near the bottom of the pillar to create a flange that can be joined to the rocker. Access openings are included in the pillar so that the pillar can be welded to the rocker assembly at multiple locations.

Although vehicle manufacturers use various structures and components to protect a vehicle's occupants during a side impact collision, typically these approaches provide only limited protection while significantly increasing vehicle weight. Accordingly, what is needed is an improved system for coupling a strong, preferably reinforced, B-pillar to the rocker panel, thereby achieving side impact safety. The present invention provides such a system.

SUMMARY OF THE INVENTION

The present invention provides a reinforced B-pillar assembly that achieves improved side impact resistance by coupling the B-pillar assembly directly to an outer mounting surface of the rocker panel as well as to an extended brace that is attached to the upper and rear mounting surfaces of the rocker.

In accordance with the invention, a vehicle pillar to rocker assembly is disclosed that includes a rocker panel; a B-pillar brace mechanically coupled (e.g., welded, riveted) to the upper mounting surface of the rocker panel, where the brace extends above the upper mounting surface; and a B-pillar, where a first portion of the B-pillar is mechanically coupled (e.g., welded, riveted) to the outer mounting surface of the rocker panel and a second portion of the B-pillar is mechanically coupled (e.g., welded, riveted) to a mounting surface of the B-pillar brace. The rocker panel may be comprised of a single piece extrusion which may include a cavity running longitudinally throughout the panel and may include one or more internal reinforcing walls. The B-pillar brace may further be mechanically coupled (e.g., welded, riveted) to the rear mounting surface of the rocker panel. The second portion of the B-pillar may be comprised of a B-pillar mounting flange and the mounting surface of the B-pillar brace may be comprised of a complementary brace mounting flange, where the B-pillar mounting flange is mechanically coupled (e.g., welded, riveted) to the brace mounting flange. The second portion of the B-pillar may be comprised of first and second B-pillar mounting flanges located on either side of the B-pillar centerline and the mounting surface of the B-pillar brace may be comprised of first and second complementary brace mounting flanges, where the first B-pillar mounting flange is mechanically coupled (e.g., welded, riveted) to the first brace mounting flange and the second B-pillar mounting flange is mechanically coupled (e.g., welded, riveted) to the second brace mounting flange.

The vehicle pillar to rocker assembly may further comprise a B-pillar reinforcement member, where a lower portion of the B-pillar reinforcement member is mechanically coupled (e.g., welded, riveted) to the outer mounting surface of the rocker panel and to the first portion of the B-pillar, and where the B-pillar reinforcement member extends from the lower end of the B-pillar to at least 50%, or at least 75%, of the height of the B-pillar.

The vehicle pillar to rocker assembly may further comprise an inner B-pillar member mechanically coupled to the B-pillar, where a lower portion of the inner B-pillar member is mechanically coupled (e.g., welded, riveted) to a mounting flange of the B-pillar brace, and where the inner B-pillar member extends downwardly from an upper end of the B-pillar to at least 50%, or at least 75%, of the height of the B-pillar. The assembly may further comprise a B-pillar reinforcement member interposed between the B-pillar and the inner B-pillar member, and where the inner B-pillar member extends downwardly from an upper end of the B-pillar to at least 50%, or at least 75%, of the height of the B-pillar.

A further understanding of the nature and advantages of the present invention may be realized by reference to the remaining portions of the specification and the drawings.

DESCRIPTION OF THE SPECIFIC EMBODIMENTS

Figure 1:
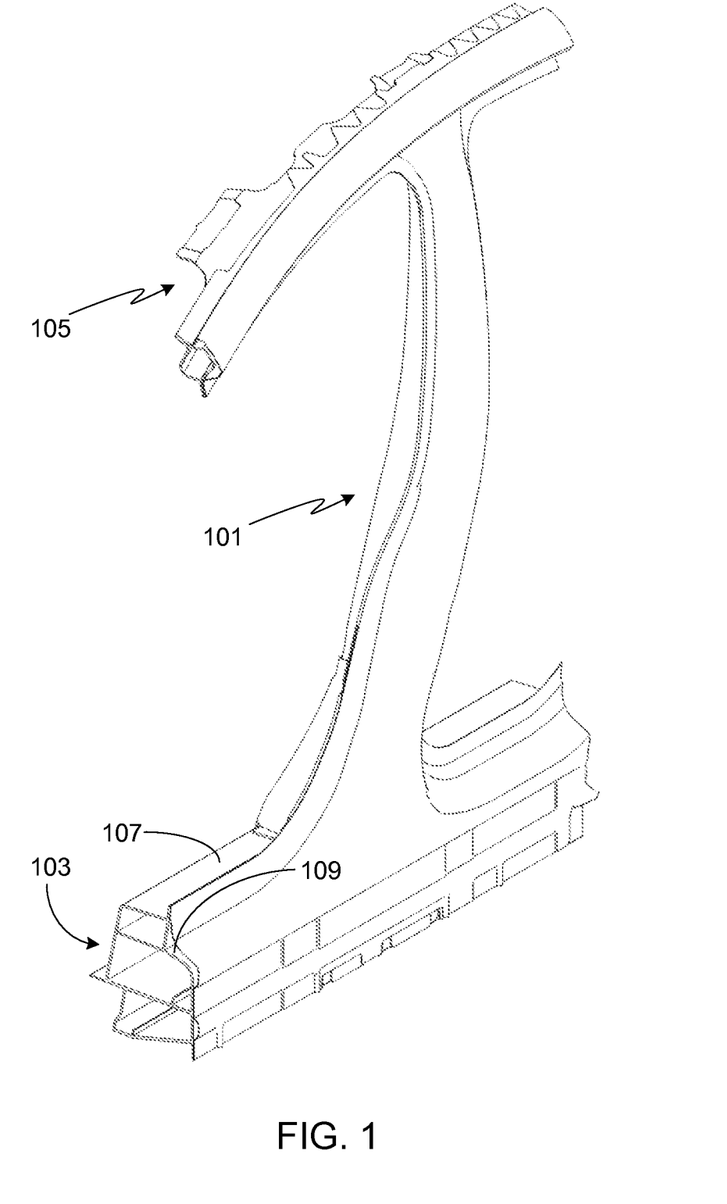
FIG. 1 provides an outside perspective view of a B-pillar assembly mounted to the rocker panel and a roofline structural assembly.
Figure 2:
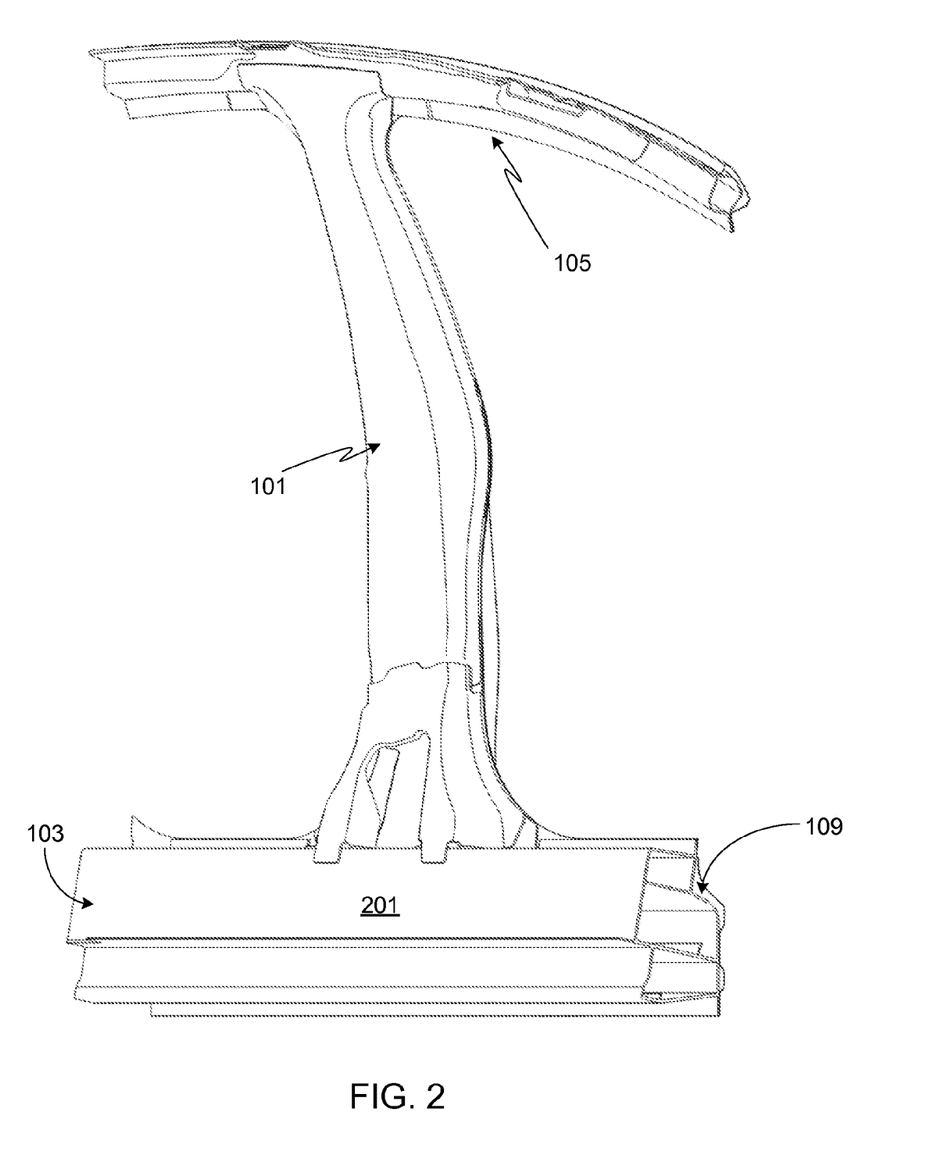
FIG. 2 provides an inside perspective view of the B-pillar assembly of FIG. 1, also shown mounted to the rocker panel and the roofline structural assembly.
Figure 3:
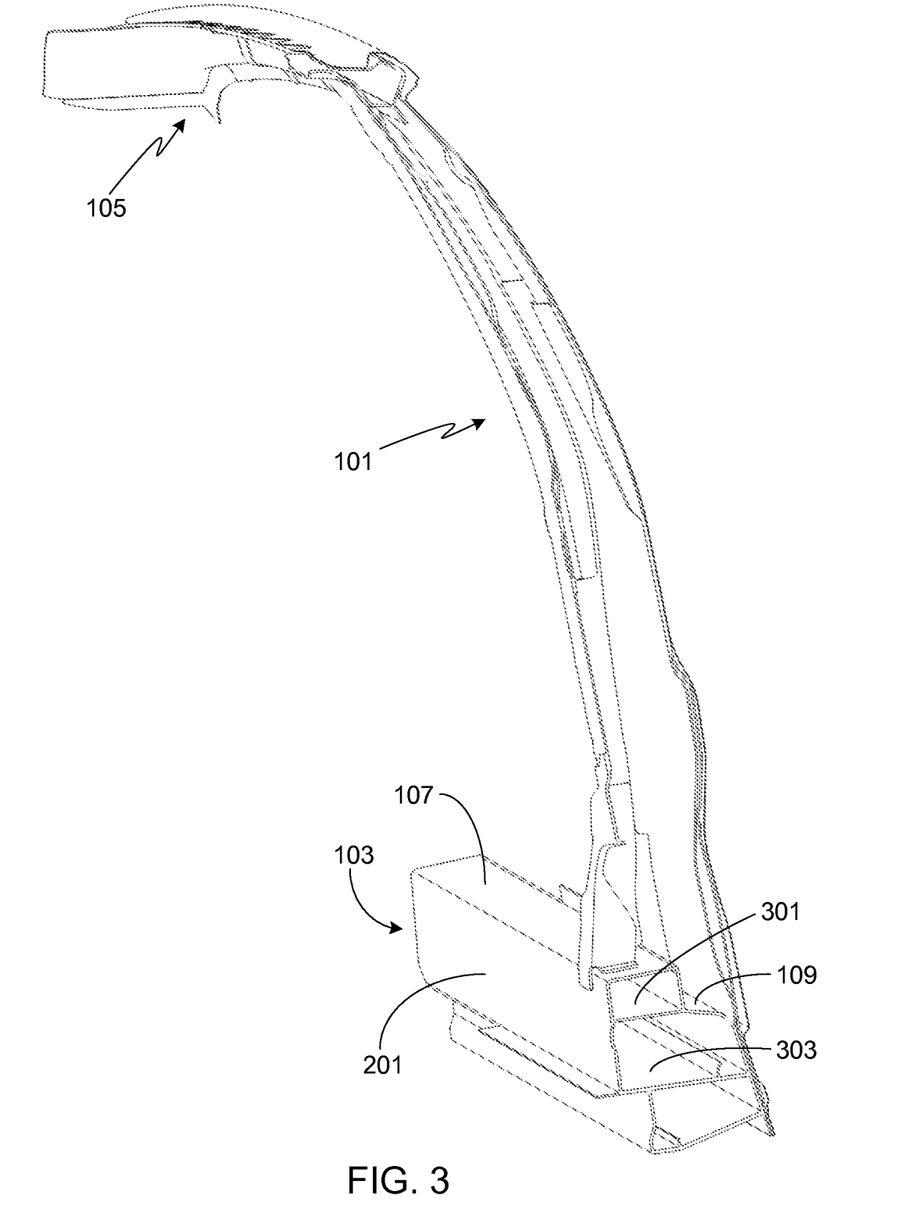
FIG. 3 provides a perspective, cross-sectional view of the B-pillar assembly shown in FIGS. 1 and 2.

FIGS. 1 and 2 provide outside and inside perspective views, respectively, of a reinforced B-pillar assembly 101 attached to a rocker panel 103. Also visible in this figure is roofline structural assembly 105. FIG. 3 provides a cross-sectional view of the assemblies shown in FIGS. 1 and 2. As described in detail below and visible in FIG. 3, B-pillar assembly 101 includes at least one reinforcing member, thus increasing the strength of the pillar. Note that in order to improve the strength and rigidity of the overall assembly, the reinforcing member(s) is attached to rocker panel 103.

In order to distribute loads effectively to rocker 103, for example impact loads arising from a side impact collision, B-pillar assembly 101 is mechanically coupled to rocker 103 at multiple locations and on multiple surfaces. Specifically, B-pillar assembly 101 is coupled, directly or indirectly, to the rear surface 201, the upper surface 107, and the outer surface 109 of rocker 103. Rocker 103 is preferably comprised of a single piece of material rather than being fabricated from multiple panels (e.g., inner panel, outer panel, reinforcing panel) that are welded together. In the preferred and illustrated embodiment, rocker 103 is fabricated from aluminum or an aluminum alloy using an extrusion process, the single piece rocker including one or more integral and internal reinforcing walls (e.g., walls 301/303) that define multiple internal cavities within the rocker. The rocker may also utilize a staggered rocker section design as illustrated. Details of an extruded, single piece rocker such as that shown in the present description is provided in co-pending U.S. patent application Ser. No. 13/308,206, filed 30 Nov. 2011, and found in U.S. Patent Application Publication No. 2012/0153682A1, published Jun. 21, 2012.

Figure 4:
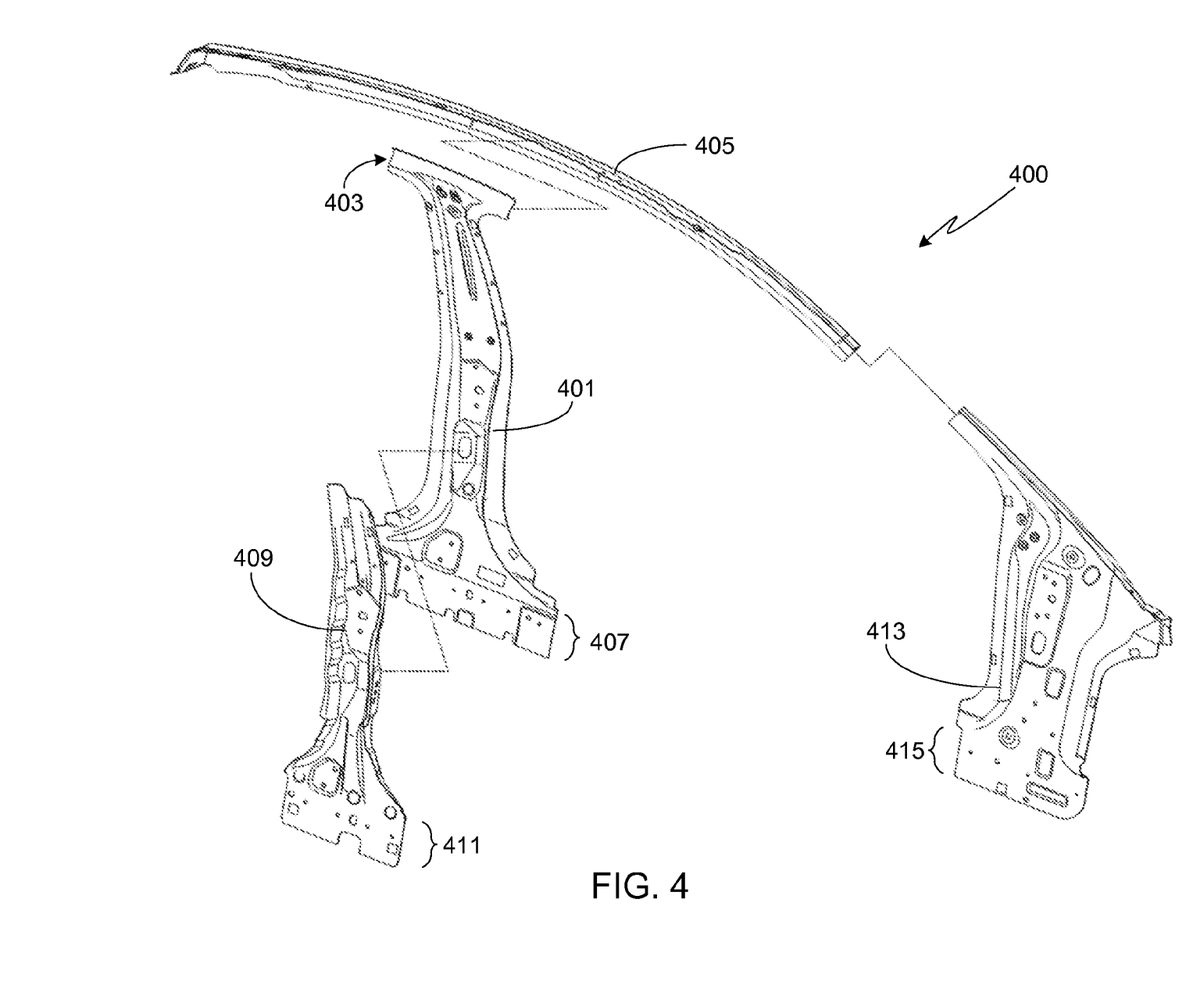
FIG. 4 provides a perspective view of the outer B-pillar and the primary pillar reinforcement member prior to assembly.

FIGS. 4-8 illustrate the primary components associated with the preferred embodiment of the reinforced B-pillar assembly 101 through a series of assembly drawings. In FIG. 4, B-pillar 401 is shown, this pillar extending completely between a first, upper flange 403 used to couple B-pillar 401 to roofline structure 405, to a second, lower flange 407 used to couple B-pillar 401 to rocker 103 (not shown in this figure). Mounted to an interior surface of B-pillar 401 is the primary reinforcement member 409. Reinforcement member 409 includes a lower flange 411, thus allowing it to be coupled to rocker 103 as well as B-pillar 401. Preferably reinforcement member 409 extends at least 50% of the height of B-pillar 401, more preferably at least 60% of the height of B-pillar 401, and still more preferably at least 75% of the height of B-pillar 401. At a minimum, reinforcement member 409 is sufficiently tall to allow it to be mechanically coupled to the B-pillar brace member shown in FIG. 8 in addition to being mechanically coupled to rocker 103. Note that in FIG. 4, the vehicle A-pillar 413 is also shown, pillar 413 including a lower flange 415 to enable it to be coupled to rocker 103. In the preferred embodiment, B-pillar 401 and reinforcement member 409 are fabricated from steel while both the roofline structure 405 and A-pillar 413 are fabricated from aluminum or an aluminum alloy.

Figure 5:
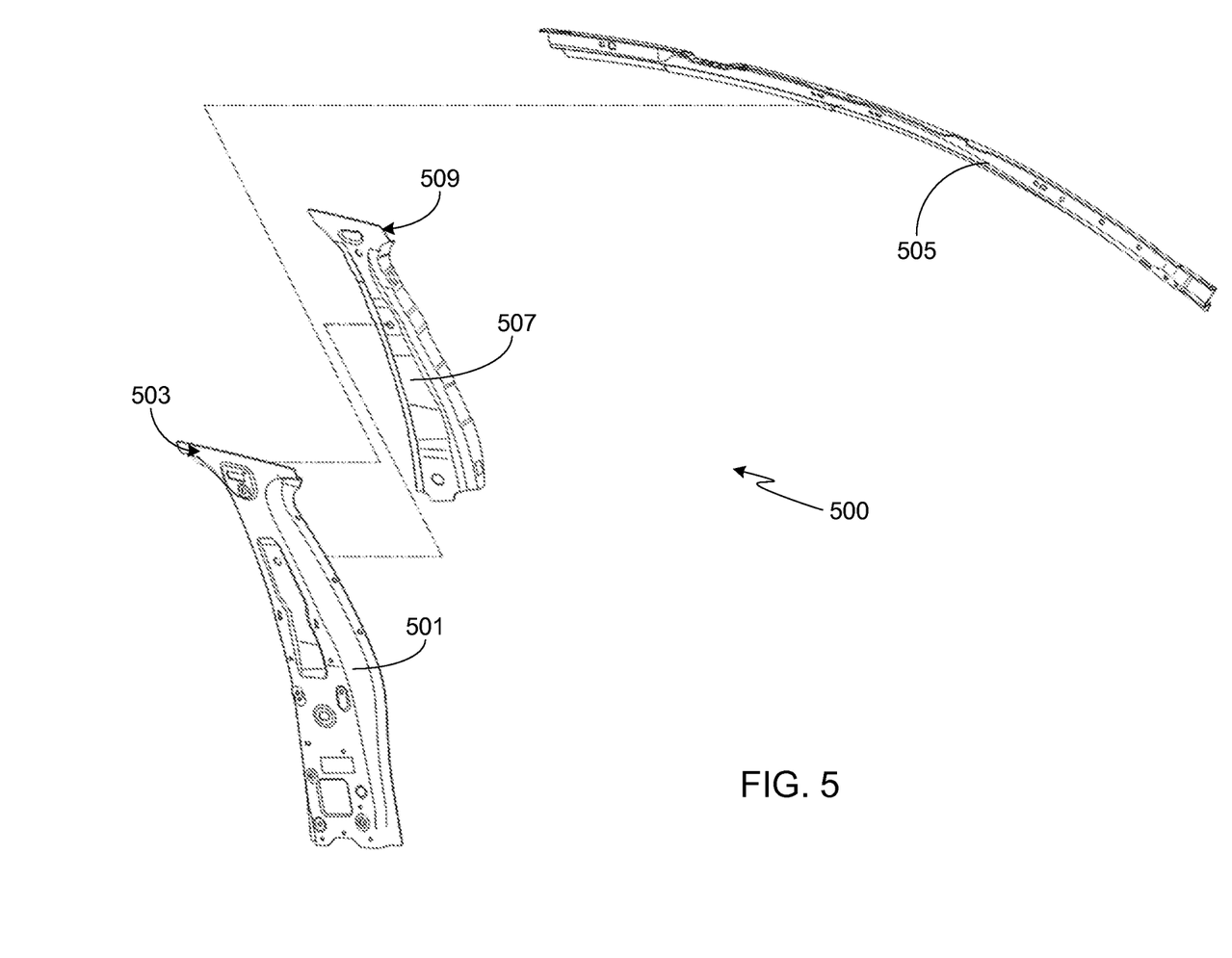
FIG. 5 provides a perspective view of the inner B-pillar and the secondary pillar reinforcement member prior to assembly.

FIG. 5 illustrates the members that couple to the inside (i.e., cabin side) of the combination of B-pillar 401 and primary reinforcement member 409. Inner B-pillar member 501 is complementary to B-pillar 401 and configured to provide the interior surface (i.e., cabin-side surface) of B-pillar assembly 101. Member 501 includes a roofline structure mounting flange 503 that is used to couple to inner roofline structure 505. Preferably inner B-pillar member 501 extends from inner roofline structure 505 down to at least the B-pillar brace member (shown in FIG. 8). More preferably, inner B-pillar member 501 is coupled to the B-pillar brace member. As shown, coupled to the exterior surface of inner B-pillar member 501 is a secondary reinforcement member 507. Member 507 includes a roofline structure mounting flange 509. Preferably secondary reinforcement member 507 extends at least 50% of the height of B-pillar member 501, more preferably at least 60% of the height of member 501, and still more preferably at least 75% of the height of member 501. In the preferred embodiment, B-pillar member 501 and secondary reinforcement member 507 are fabricated from steel while the inner roofline structure 505 is fabricated from aluminum or an aluminum alloy.

Figure 6:
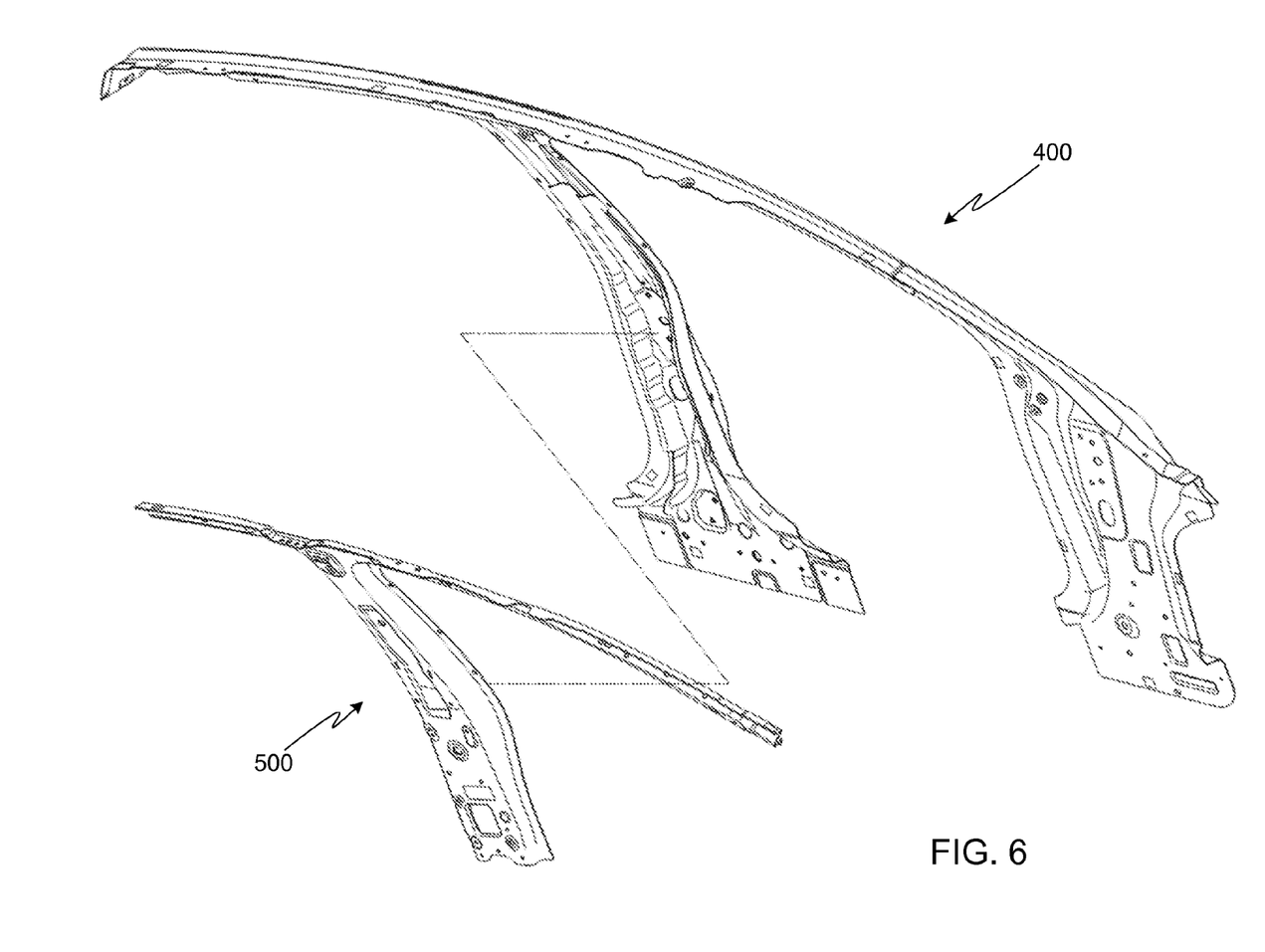
FIG. 6 illustrates the manner in which the inner assembly shown in FIG. 5 is configured to fit within the outer assembly shown in FIG. 4.
Figure 7:
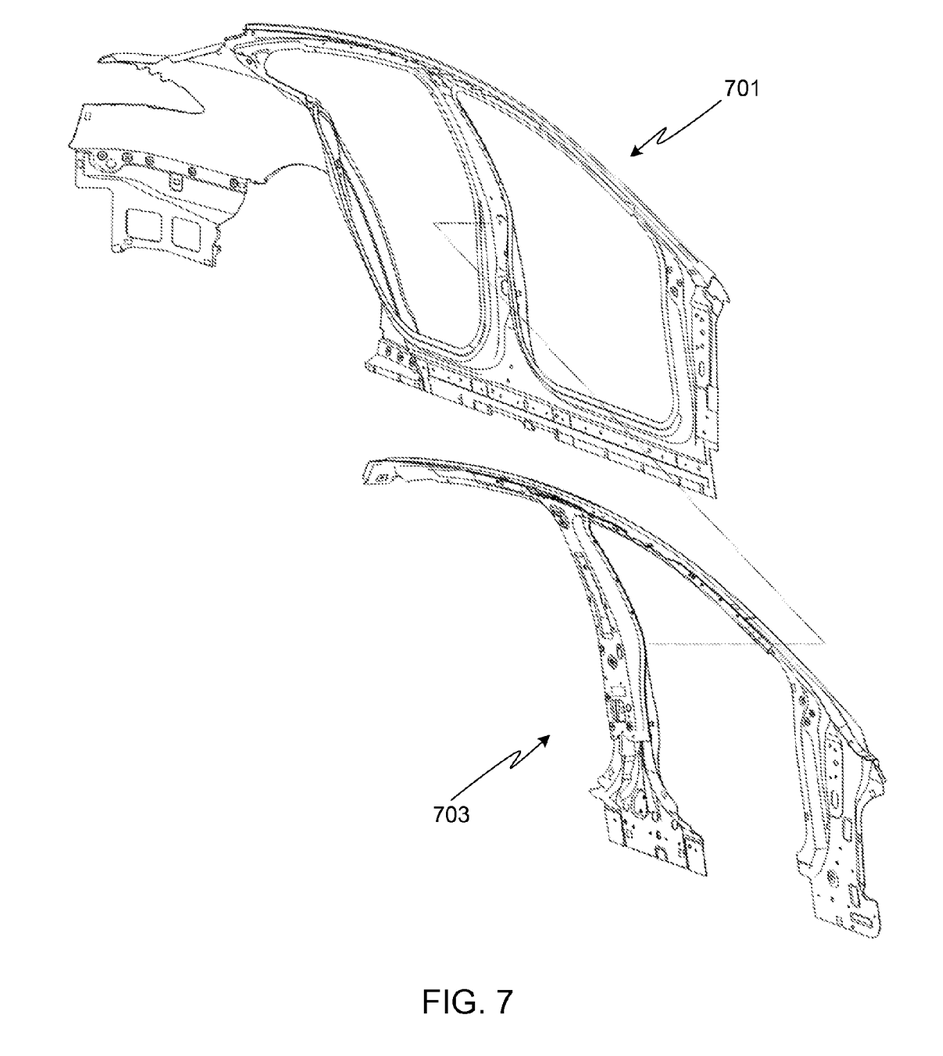
FIG. 7 illustrates the manner in which the body side panel is configured to be mounted to the combined side structural assembly (i.e., the combination of the outer assembly shown in FIG. 4 and the inner assembly shown in FIG. 5)

FIG. 6 illustrates the manner in which the inner assembly 500 is configured to fit within outer assembly 400. FIG. 7 illustrates the manner in which body side panel 701 is configured to be mounted to assembly 703, assembly 703 being comprised of outer assembly 400 and inner assembly 500. Preferably body side panel 701 is comprised of aluminum or an aluminum alloy.

Figure 8:
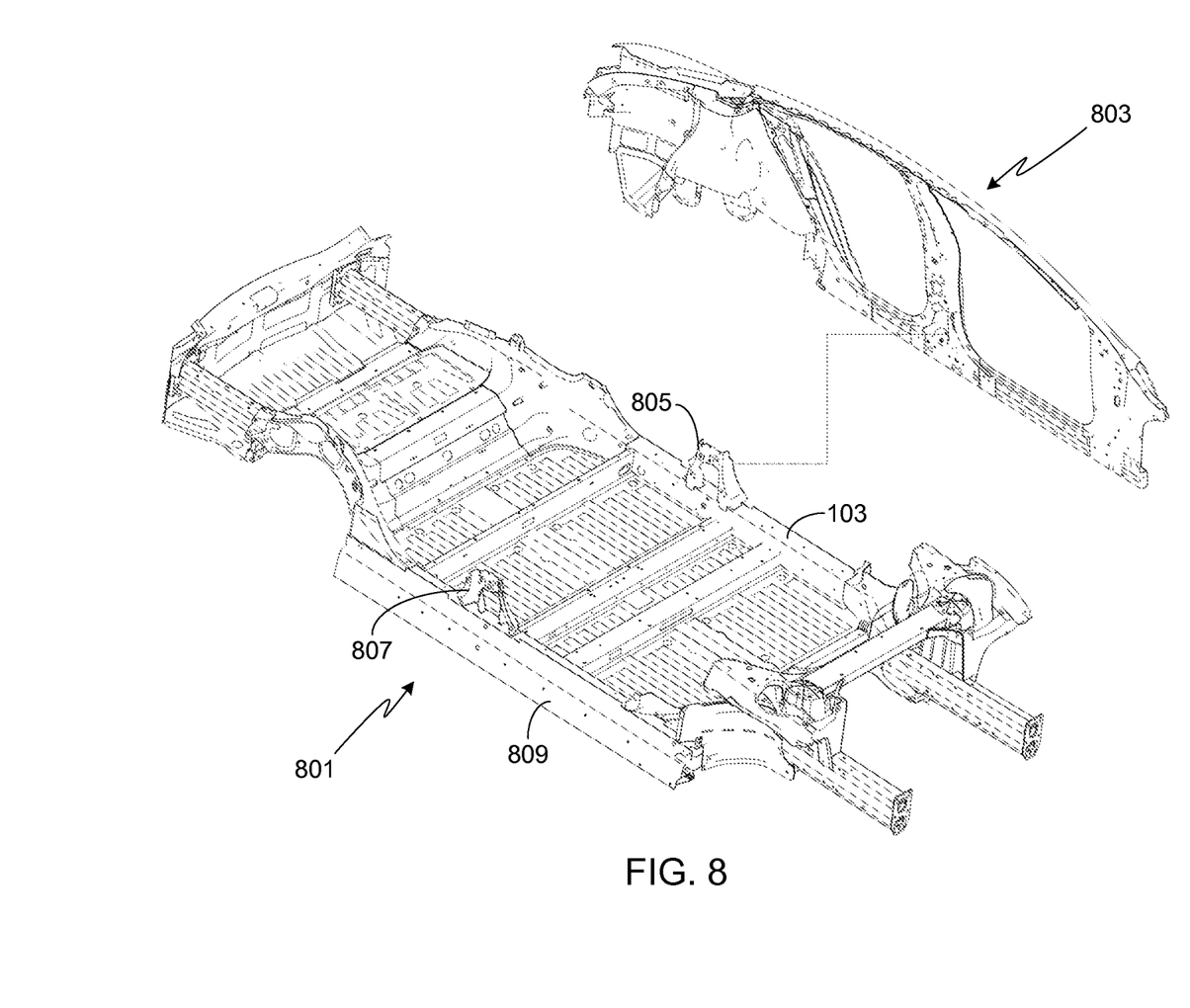
FIG. 8 illustrates the fit between the vehicle underbody and the side body assembly.

FIG. 8 illustrates the fit between the vehicle underbody 801 and the side body assembly 803, side body assembly 803 being comprised of body side panel 701 and assembly 703. In addition to attaching B-pillar assembly 101 along with body side panel 701 to rocker 103, the B-pillar assembly 101 is also attached to B-pillar brace member 805. Note that in this figure, the right side B-pillar brace member 807 is also shown coupled to right side rocker 809.

As noted above, in order to enhance the vehicle's resistance to side impact loads the present invention adds one or more reinforcing members to the B-pillar. For example, in the exemplary and illustrated embodiment, both a primary reinforcement member 409 and a secondary reinforcement member 507 are added to the B-pillar assembly. In addition to adding reinforcing members to the B-pillar, the present invention utilizes a brace member, e.g., B-pillar brace member 805, which allows the B-pillar assembly to be mechanically coupled to multiple surfaces of the rocker. Additionally, the brace member substantially extends the height of the coupling between the B-pillar assembly and the rocker panel, thereby significantly improving the coupling and distribution of impact energy into the rocker, especially from impact loads that hit the B-pillar at a location above the rocker panel.

Figure 9:
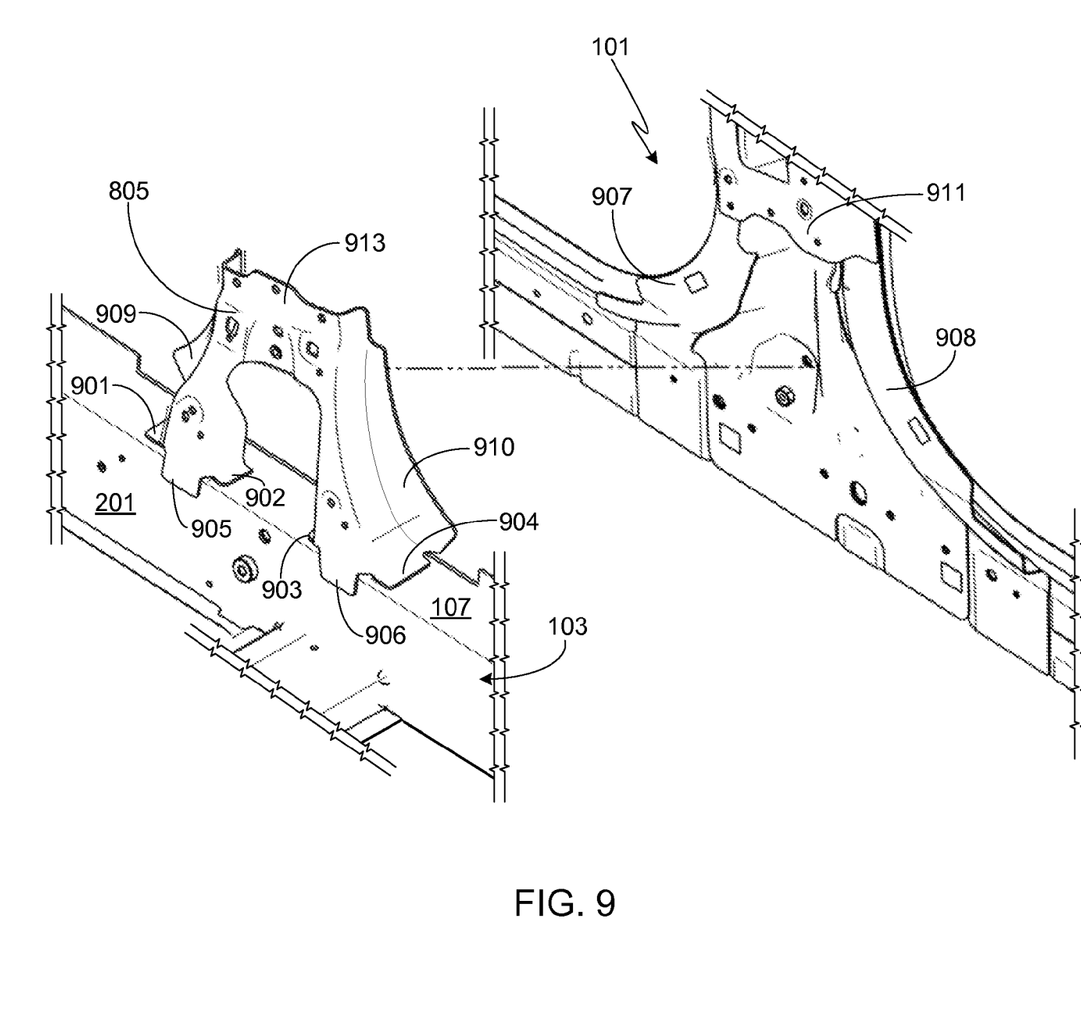
FIG. 9 provides a detailed view of the B-pillar brace and the lower portion of the B-pillar assembly.
Figure 10:
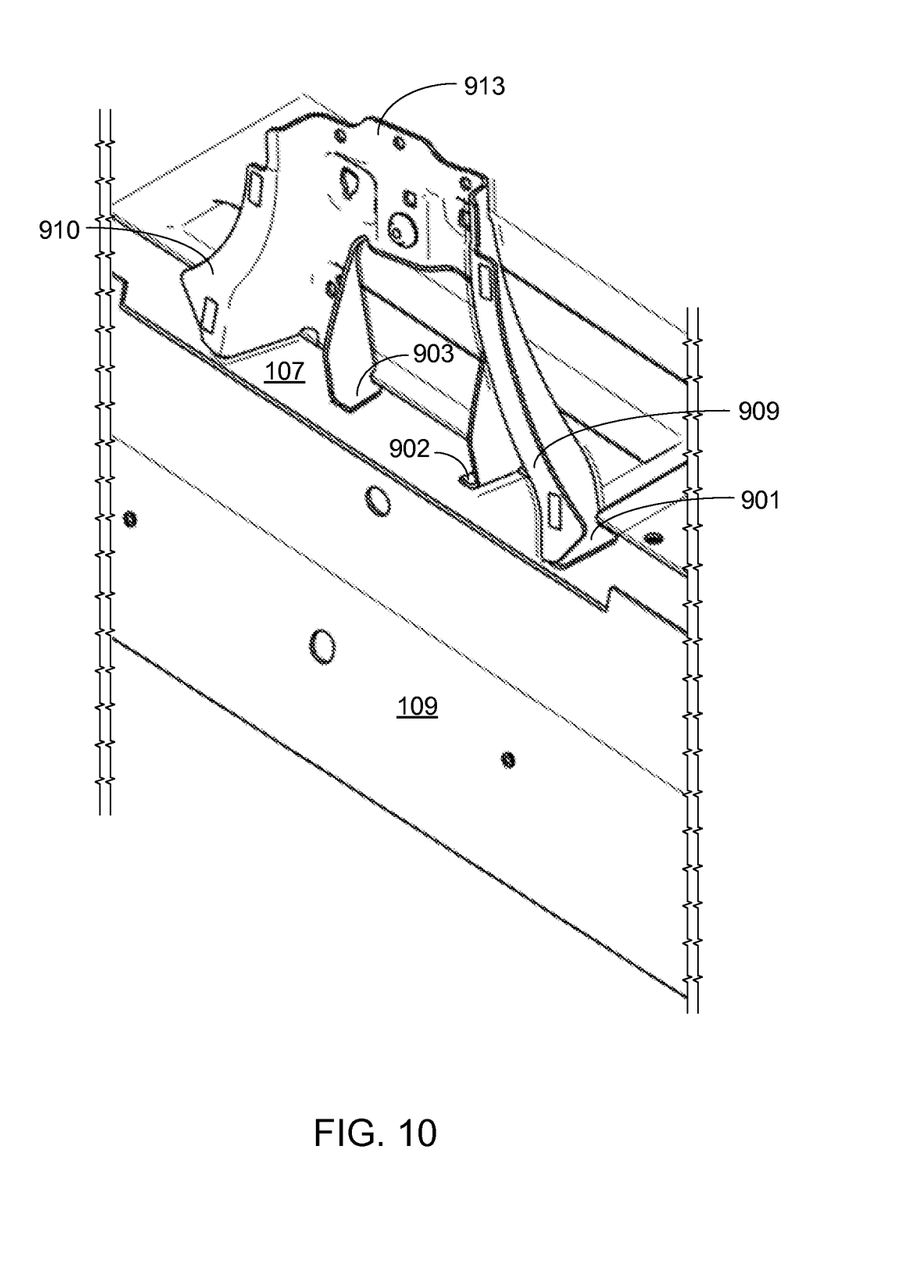
FIG. 10 provides a detailed view of the reverse side of the B-pillar brace.

FIG. 9 provides a detailed view of B-pillar brace 805 coupled to rocker 103. FIG. 9 also shows the portion of B-pillar assembly 101 that is configured to be coupled to brace 805 as well as rocker 103. FIG. 10 shows the back surface of brace 805, i.e., the surface of the brace that is configured to be mechanically coupled to B-pillar assembly 101.

B-pillar brace 805 is designed to be mechanically attached, for example via welding or rivets, to multiple faces of rocker 103 as well as one or more mounting faces of B-pillar assembly 101. As such, in the preferred and illustrated embodiment, brace 805 is of approximately the same depth as rocker 103, thus allowing it to be attached to the upper mounting surface 107 of rocker 103 using four mounting tabs 901-904, and to the rear mounting surface 201 of rocker 103 using two mounting tabs 905-906. B-pillar assembly 101 is attached to the outer mounting surface 109 of rocker 103 and to brace 805. Preferably pillar assembly mounting flanges 907/908 are attached to complementary brace mounting flanges 909/910. Similarly, pillar assembly mounting flange 911 is attached to complementary brace mounting flange 913.

Figure 11:
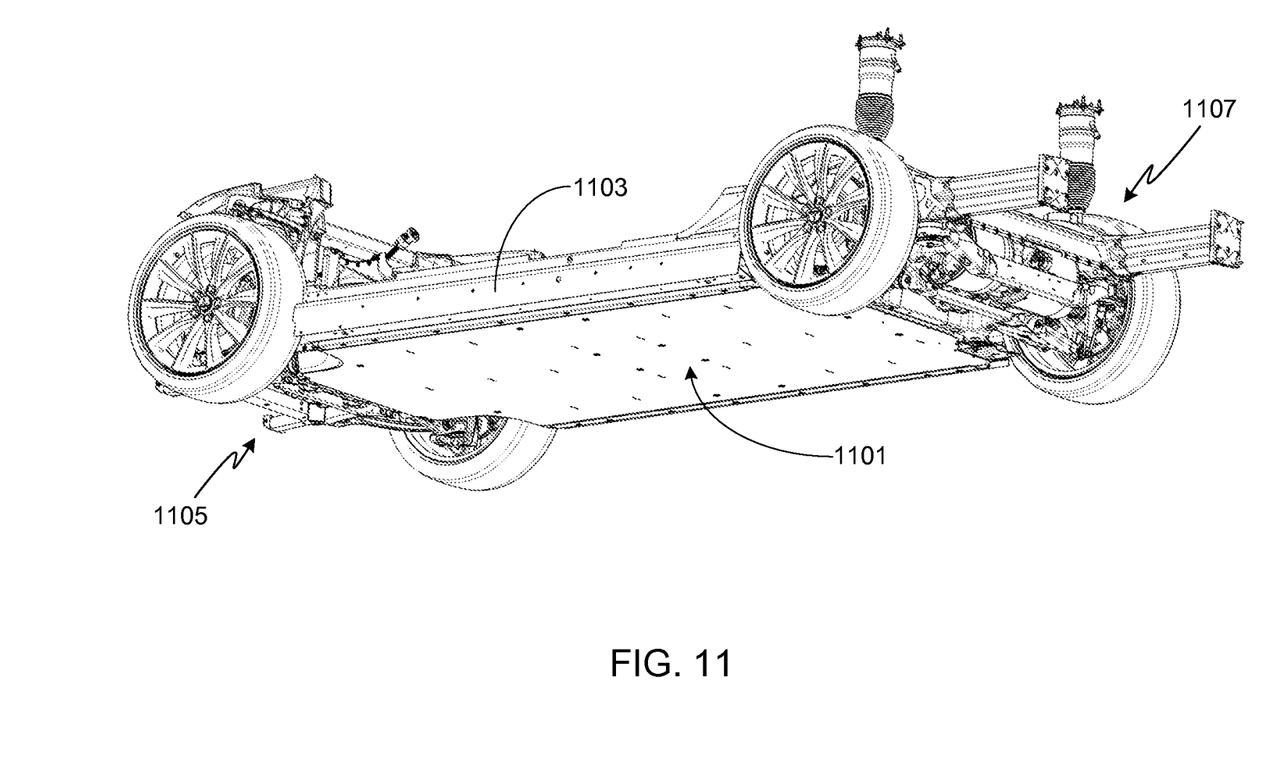
FIG. 11 provides a perspective view of a vehicle's underbody with a battery pack incorporated into the vehicle structure and attached to the rocker panels.
Figure 12:
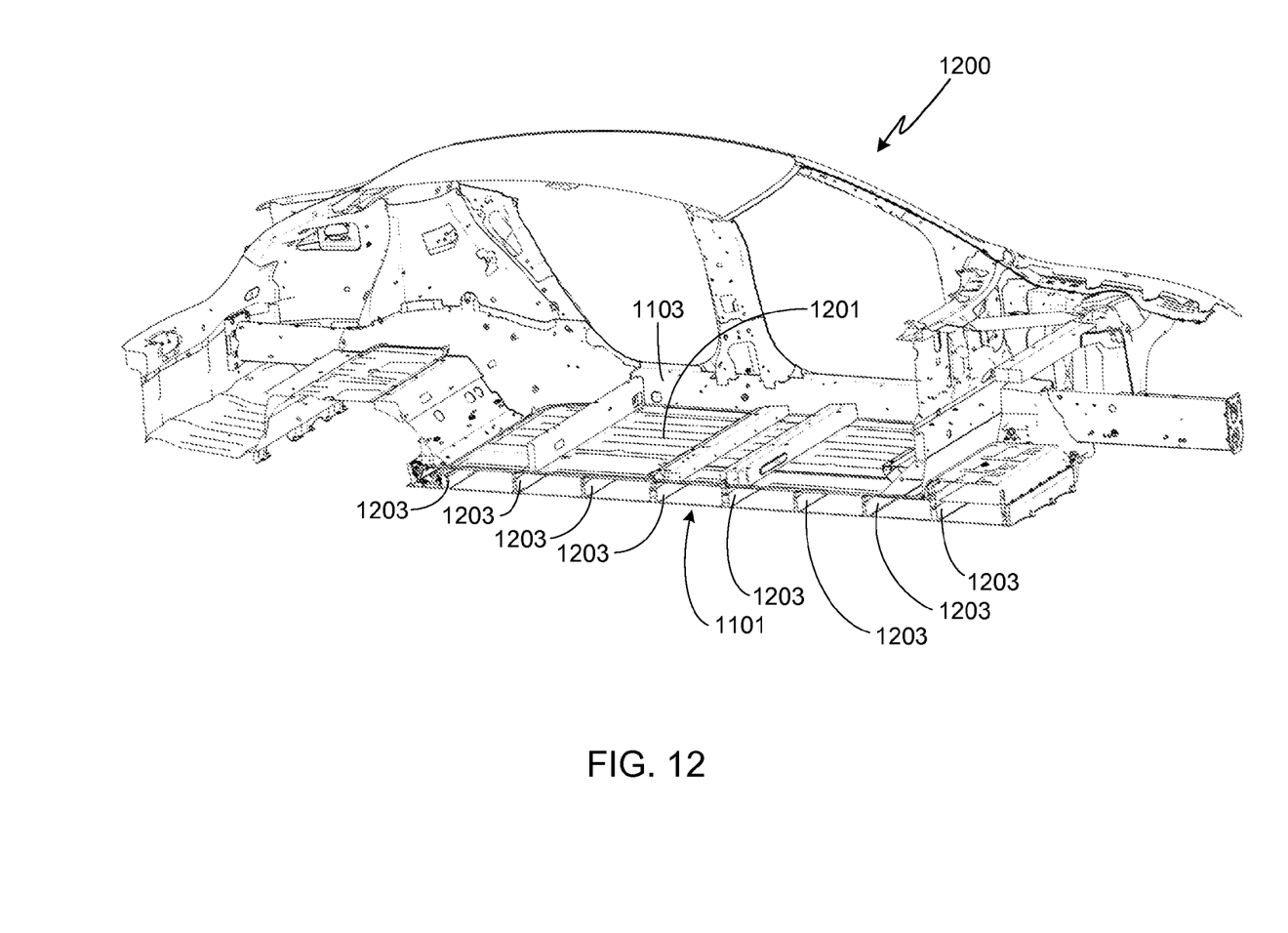
FIG. 12 provides a perspective, cross-sectional view of the battery pack shown in FIG. 11 mounted under the floor panel of the vehicle.

The present invention achieves improved side impact resistance by coupling a reinforced B-pillar assembly directly to the rocker panel as well as to an extended brace that is attached to the top and back rocker faces. Additionally, in the preferred embodiment rocker rigidity is dramatically increased by interposing a rigid and structurally reinforced battery pack enclosure between the two rocker panels. For example, FIG. 11 shows a battery pack enclosure 1101 that transverses the width of the vehicle and is attached to the rocker panels 1103. In this embodiment, battery pack enclosure 1101 also extends most of the distance between the front suspension 1105 and the rear suspension 1107. FIG. 12 provides a perspective, cross-sectional view of battery pack enclosure 1101 mounted under floor panel 1201 of vehicle 1200. In this view, battery pack cross-members 1203 are also visible, cross-members 1203 providing mechanical and structural strength and rigidity to the battery pack and therefore to rockers 1103 to which the battery pack is attached. Additionally, cross-members 1203 help to segregate battery pack thermal events by providing a thermal barrier between groups of cells as well as minimizing gas flow between battery pack sections. Preferably, and as shown, the cross-members in proximity to the B-pillar assembly are larger than the other cross-members, thus enhancing the resistance of the structure to side-impact collisions. Note that in FIG. 12 cells are not shown contained within the battery pack, thus simplifying the figure. Further details regarding the attachment of a battery pack enclosure between and to the rockers of a vehicle are provided in co-pending U.S. patent application Ser. No. 13/308,300, filed 30 Nov. 2011, and found in U.S. Patent Application Publication No. 2012/0161472A1, published Jun. 28, 2012, the entire disclosure of which is incorporated herein for any and all purposes.

As noted above, the preferred embodiment of the invention utilizes both aluminum (and/or aluminum alloy) components and steel components. In this embodiment, preferably connections between steel components, or between steel and aluminum (aluminum alloy) components, are made using rivets, and more preferably using self-piercing rivets. Preferably connections between aluminum components (or aluminum alloy components) are made via spot welding.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

The invention claimed is:

1. A vehicle pillar to rocker assembly comprising:
a rocker panel, said rocker panel comprising an outer mounting surface, an upper mounting surface and a rear mounting surface;
a B-pillar brace mechanically coupled to said upper mounting surface of said rocker panel, wherein said B-pillar brace extends above said upper mounting surface of said rocker panel;
a B-pillar, wherein a first portion of said B-pillar proximate to a lower end of said B-pillar is mechanically coupled to said outer mounting surface of said rocker panel, and wherein a second portion of said B-pillar is mechanically coupled to a mounting surface of said B-pillar brace; and
a first B-pillar reinforcement member, wherein a lower portion of said B-pillar reinforcement member is mechanically coupled to said outer mounting surface of said rocker panel and to said first portion of said B-pillar, and wherein said B-pillar reinforcement member extends from said lower end of said B-pillar to at least 50% of a B-pillar height.

2. The vehicle pillar to rocker assembly of claim 1, wherein said B-pillar brace is mechanically coupled to said rear mounting surface of said rocker panel.

3. The vehicle pillar to rocker assembly of claim 2, wherein said B-pillar brace is mechanically coupled to said upper mounting surface of said rocker panel using a first plurality of welds, and wherein said B-pillar brace is mechanically coupled to said rear mounting surface of said rocker panel using a second plurality of welds.

4. The vehicle pillar to rocker assembly of claim 1, wherein said first portion of said B-pillar is mechanically coupled to said outer mounting surface of said rocker panel using a plurality of rivets.

5. The vehicle pillar to rocker assembly of claim 1, wherein said second portion of said B-pillar further comprises a B-pillar mounting flange, wherein said mounting surface of said B-pillar brace further comprises a brace mounting flange, and wherein said B-pillar mounting flange is mechanically coupled to said brace mounting flange.

6. The vehicle pillar to rocker assembly of claim 5, wherein said B-pillar mounting flange is mechanically coupled to said brace mounting flange using a plurality of rivets.

7. The vehicle pillar to rocker assembly of claim 1, wherein said second portion of said B-pillar further comprises a first B-pillar mounting flange and a second B-pillar mounting flange, wherein said first and second B-pillar mounting flanges are located on either side of a B-pillar centerline, wherein said mounting surface of said B-pillar brace further comprises a first brace mounting flange and a second brace mounting flange, wherein said first and second brace mounting flanges are complementary to said first and second B-pillar mounting flanges, wherein said first B-pillar mounting flange is mechanically coupled to said first brace mounting flange, and wherein said second B-pillar mounting flange is mechanically coupled to said second brace mounting flange.

8. The vehicle pillar to rocker assembly of claim 7, wherein said first B-pillar mounting flange is mechanically coupled to said first brace mounting flange and said second B-pillar mounting flange is mechanically coupled to said second brace mounting flange using a plurality of rivets.

9. The vehicle pillar to rocker assembly of claim 1, wherein said B-pillar brace is mechanically coupled to said rear mounting surface of said rocker panel, wherein said second portion of said B-pillar further comprises a first B-pillar mounting flange and a second B-pillar mounting flange, wherein said first and second B-pillar mounting flanges are located on either side of a B-pillar centerline, wherein said mounting surface of said B-pillar brace further comprises a first brace mounting flange and a second brace mounting flange, wherein said first and second brace mounting flanges are complementary to said first and second B-pillar mounting flanges, wherein said first B-pillar mounting flange is mechanically coupled to said first brace mounting flange, and wherein said second B-pillar mounting flange is mechanically coupled to said second brace mounting flange.

10. The vehicle pillar to rocker assembly of claim 1, wherein said first B-pillar reinforcement member extends from said lower end of said B-pillar to at least 75% of said B-pillar height.

11. The vehicle pillar to rocker assembly of claim 1, further comprising:
an inner B-pillar member, wherein said inner B-pillar member is mechanically coupled to said B-pillar, wherein a lower portion of said inner B-pillar member is mechanically coupled to a mounting flange of said B-pillar brace, and wherein said inner B-pillar member extends downwardly from an upper end of said B-pillar to at least 50% of a B-pillar height.

12. The vehicle pillar to rocker assembly of claim 11, wherein said B-pillar brace is mechanically coupled to said rear mounting surface of said rocker panel, wherein said second portion of said B-pillar further comprises a first B-pillar mounting flange and a second B-pillar mounting flange, wherein said first and second B-pillar mounting flanges are located on either side of a B-pillar centerline, wherein said mounting surface of said B-pillar brace further comprises a first brace mounting flange and a second brace mounting flange, wherein said first and second brace mounting flanges are complementary to said first and second B-pillar mounting flanges, wherein said first B-pillar mounting flange is mechanically coupled to said first brace mounting flange, and wherein said second B-pillar mounting flange is mechanically coupled to said second brace mounting flange.

13. The vehicle pillar to rocker assembly of claim 11, further comprising a second B-pillar reinforcement member, wherein said second B-pillar reinforcement member is interposed between said B-pillar and said inner B-pillar member, and wherein said second B-pillar reinforcement member extends downwardly from an upper end of said inner B-pillar member to at least 50% of said B-pillar height.

14. The vehicle pillar to rocker assembly of claim 13, wherein said B-pillar brace is mechanically coupled to said rear mounting surface of said rocker panel, wherein said second portion of said B-pillar further comprises a first B-pillar mounting flange and a second B-pillar mounting flange, wherein said first and second B-pillar mounting flanges are located on either side of a B-pillar centerline, wherein said mounting surface of said B-pillar brace further comprises a first brace mounting flange and a second brace mounting flange, wherein said first and second brace mounting flanges are complementary to said first and second B-pillar mounting flanges, wherein said first B-pillar mounting flange is mechanically coupled to said first brace mounting flange, and wherein said second B-pillar mounting flange is mechanically coupled to said second brace mounting flange.

15. The vehicle pillar to rocker assembly of claim 1, wherein said rocker panel is extruded as a single piece, and wherein said rocker panel further comprises at least one enclosed cavity running longitudinally throughout said rocker panel.

16. The vehicle pillar to rocker assembly of claim 15, said rocker panel further comprising at least one internal reinforcing wall, said at least one internal reinforcing wall dividing said at least one enclosed cavity into a plurality of cavities.

* * * * *